Nov. 26, 1968    R. ANNEN    3,412,472
UNIVERSAL GYROSCOPE
Filed July 25, 1966    2 Sheets-Sheet 1
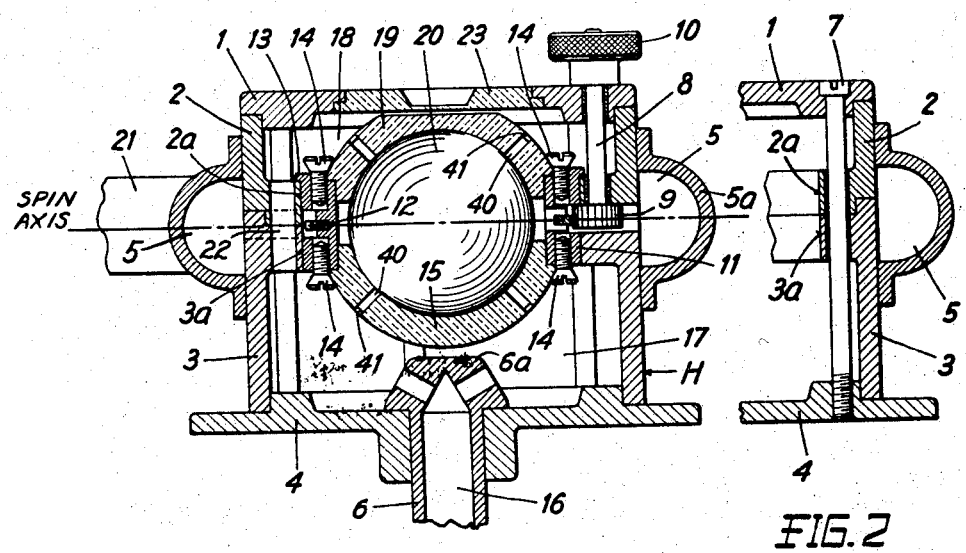
FIG.1
FIG.2
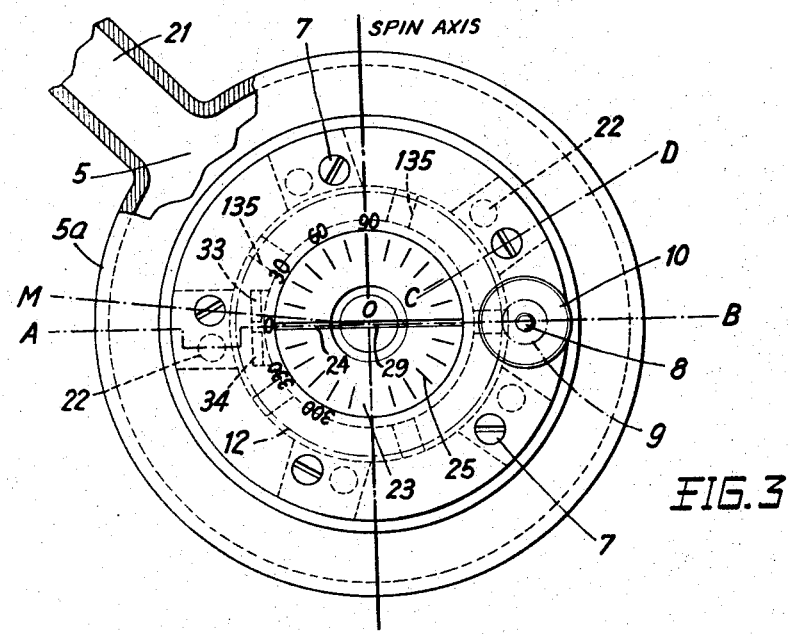
FIG.3
INVENTOR:
Robert Annen
By Werner W. Kleeman
His Attorney

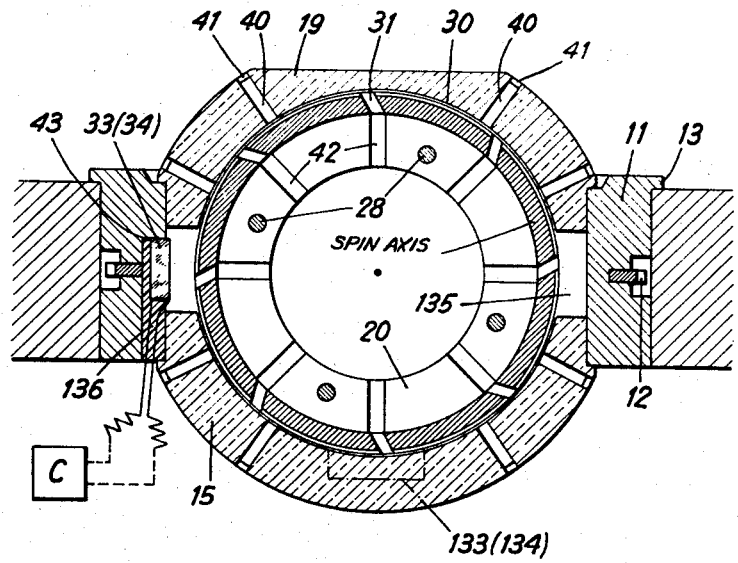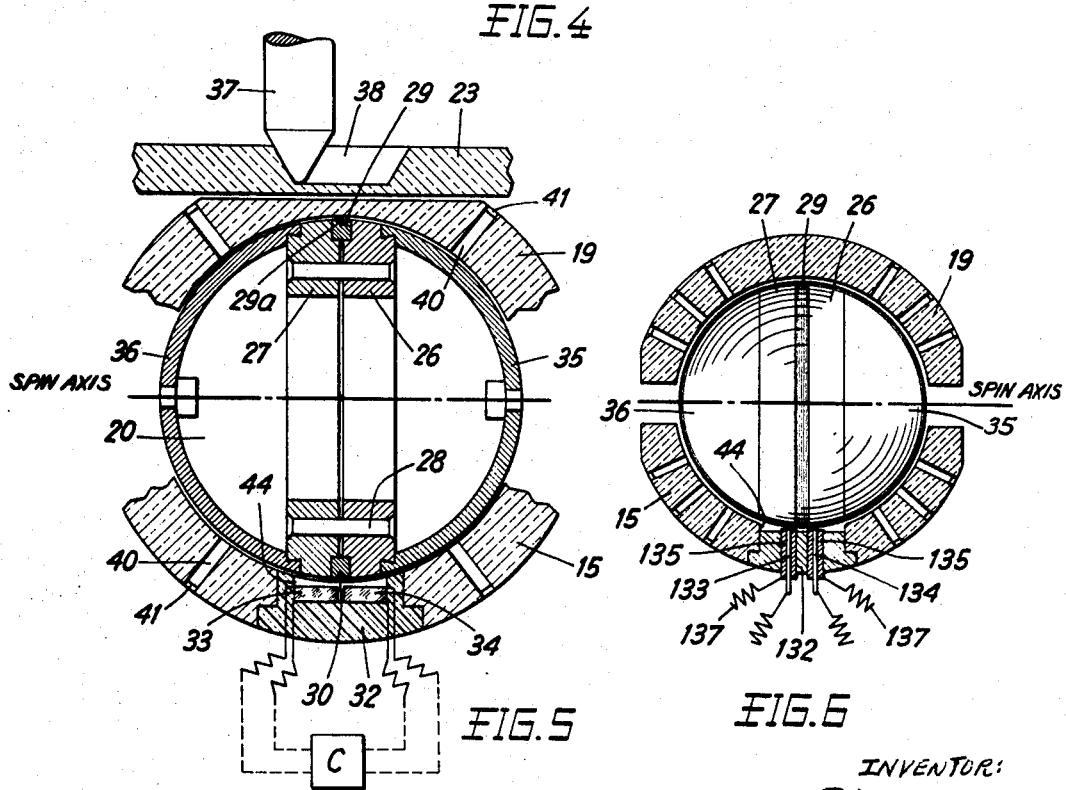

United States Patent Office 3,412,472
Patented Nov. 26, 1968

3,412,472
UNIVERSAL GYROSCOPE
Robert Annen, 37 Rue du Stand, Bienne,
Bern, Switzerland
Filed July 25, 1966, Ser. No. 567,649
Claims priority, application Switzerland, Jan. 13, 1966,
401/66
12 Claims. (Cl. 33—204)

ABSTRACT OF THE DISCLOSURE

A universal gyroscope comprising two oppositely situated, substantially semi-spherical bearing cups for housing a rotor mounted therein. A pressurized fluid medium serves to drive and floatingly support the rotor. The bearing cups are mounted for rotation at a support ring having discharge bore means for the fluid medium disposed substantially in an equatorial plane. A directional indicating ring is arranged substantially at the region of the equator of the rotor. Further, pick-off means cooperate with the directional indicating ring for signaling the direction and amount of the inclination of the indicating ring about selectable axes relative to its datum position, whereby depending upon the position of the last-mentioned means the gyroscope is capable of performing as directional indicator, artificial horizon or banking indicator.

---

The present invention relates to an improved gyroscope which, generally speaking, performs as directional gyro and artificial horizon when the directional indicating ring is disposed perpendicular to the major or longitudinal axis of the aircraft and which indicates banking (warping) and heading if the aforesaid indicating ring is parallel to such longitudinal axis.

In the course of a great number of systematic trials with gryroscopes of this type in which the spherical rotor spins in pressurized fluid support bearings, it has been found that two types of factors influence the position of the rotor and its axis. The first factor causes the spin axis of the rotor to very slowly assume a position in which it is situated perpendicular to the axis taken through the crown or top of both semi-spherical bearing cups. The second factor additionally causes the rotor spin axis to slowly yet continuously orient itself in a certain direction with regard to the bearing cups and that in this preferred orientation of the rotor there is achieved its greatest speed whereby turbulence is balanced. This results in suppression of the usual corrections attributable to the rotation of the earth. The rotational speed of the rotor is further considerably increased in that the throughflow cross-section of those nozzles which are arranged in the plane of the directional ring are enlarged, which normally remains in this preferred position. Thus, with an operating feed pressure of 0.25 kg./cm.² the rotational speed then reaches a value of about 35,000 revolutions per minute. At this speed the rotor has such a large gyroscopic stability that the apparatus functions extremely precisely and cannot be disturbed, so that it is extremely suitable for use with automatic pilots.

The invention contemplates providing means which deliver an electrical signal for such auto-piloting, this signal then being processed by conventional external electronic means.

Thus, a primary object of the present invention is to provide an improved universal gyroscope which is capable of performing as directional indicator, artificial horizon and banking indicator.

Another important object of this invention relates to the provision of an improved gyroscope which attains high operating speeds and is markedly insensitive to external effects such as acceleration forces.

Still another major object of this invention is directed to a gyroscope construction which can be employed to monitor the automatic pilot and also can even be used for acrobatic or stunt flying.

Accordingly, the gryroscope of the present invention is characterized by the features that it embodies two oppositely situated substantially semispherical bearing cups which internally fit the rotor and which are rotatably mounted at a ring. The ring possesses discharge bores situated in an equatorial plane for the fluid medium and additionally is provided with external teeth meshing with the teeth of an adjustment element mounted at the housing of the gyroscope. Moreover, at the equator of the rotor at the outside there is provided a directional indicating ring which cooperates with means mounted at the bearing, whereby depending upon the position of the aforesaid means, the gryroscope functions as directional gyro, artificial horzion or banking indicator.

Other features, objects and advantages of the invention will become apparent by reference to the following detailed description and drawings in which:

FIGURE 1 is a fragmentary cross-sectional view of a preferred embodiment of gyroscope taken through its vertical axis and substantially along the line MOB of FIGURE 3;

FIGURE 2 is a fragmentary cross-sectional, view of the gyroscope of FIGURES 1 and 3, taken substantially along the line C-D of FIGURE 3;

FIGURE 3 is a top plan view of the gyroscope of FIGURE 1;

FIGURE 4 is a fragmentary, vertical cross-sectional view, on an enlarged scale, taken along the plane AOB of the directional indicating ring;

FIGURE 5 is a fragmentary, cross-sectional view of a variant construction, taken along a plane which is perpendicular to the directional indicating ring; and FIGURE 6 is a cross-sectional view similar to that shown in FIGURE 5 of a further modification.

Describing now the drawings, it will be obvious by referring to FIGURE 1 that the housing H of the exemplary depicted gyroscope is composed of the cover 1, the sleeves 2 and 3 and the floor or base 4, these members being preferably formed of a light metal. Externally of the sleeves 2 and 3 there is provided a recovery chamber 5 formed by the member 5a which can also be made from a suitable light metal material. A connecting piece or infeed member 6 for the fluid (air) having a distributor head 6a and a central channel 16 communicating with the latter is pressed into the floor or base 4. Screws 7 or equivalent fastening structure tighten the cover 1 and the sleeves 2 and 3 against the base 4. A shaft 8 with pinion 9 is mounted at the housing portions 1 and 2 and to permit actuation this shaft 8 carries a knurled head 10.

A ring 11 is set in the housing portions 2 and 3 and their associated bores 2a and 3a respectively. Ring 11 carries at its central region a fixedly mounted tooth disk 12 which is divided along a diameter. Tooth disk 12 meshes with the pinion 9 so that when rotating the adjusting members 8, 9, 10, the heading can be adjusted without changing the position of the spin axis of the rotor 20. Further, ring 11 has at one end an external flange 13 (FIGURES 1 and 4) to fix its position in the vertical. Screws 14 prevent the bearing cups 15 and 19 from moving during assembly. Additionally, these screws fix the position of such bearing cups 15 and 19 with regard to one another from the moment on that the position of these bearing cups has been determined which results in the greatest rotational speed of the rotor 20.

The pressurized fluid medium delivered through the infeed channel 16 fills the chambers or compartments 17 and 18 within the housing H and presses the substantially semi-spherical bearing cups 16 and 19 against the ring 11 which is brought to bear by means of its flange 13. More precisely, this fluid passes between these compartments 17, 18 through the bores 22 provided in the manner shown in FIGURES 1 and 3. The bearing cups 15, 19 advantageously manufactured of transparent material (Plexiglas for instance) are displaceably set at the ring 11. Each bearing cup 15, 19 possesses a number of offset bore holes 40 each equipped with a nozzle, schematically indicated at 41, in order to position the rotor 20 upon a fluid cushion and also for driving this rotor. The fluid medium, typically air, which passes through the above-mentioned nozzles 41 then moves via the bores 31, 42 (FIGURE 4) into the center of the rotor 20 and then via such bores 31, 42 through discharge bores 135 (FIGURES 1 and 3) provided at the ring 11 into the restoring chamber 5. From this location the medium passes through a channel 21 back into a container or reservoir at which there is located a suitable, non-illustrated compressor delivering the pressurized fluid medium. Chamber 5 is formed by the member 5a which is pressed onto the housing elements 2, 3, as shown. Concerning the previously considered cover 1, such embodies two components, the outer of which is manufactured from metal and the inner one 23 of which is transparent material.

In FIGURE 3 depicting the inventive gyroscope as viewed from above, there will be recognized the fixing screws 7 and also the bores 22 which render possible transfer of the fluid medium from the compartment or chamber 17 into the compartment or chamber 18. Further to be seen are the black line markings 24 of the directional indicating ring. The ring scale 25 with graduations from 0° to 360° is engraved beneath the flat portion of the cover component 23 in the usual manner.

FIGURE 4 depicts the rotor 20 and the elements surrounding it on an enlarged scale, specifically in cross-section along the plane containing the directional indicating ring 29 and also along the line AOB of FIGURE 3. Again, it is possible to recognize the intermediate ring or sleeve 11 together with the tooth disk 12 and the semispherical bearing cups 15 and 19. The rotor 20 is composed of the rings 26, 27 (best seen by referring to the variant embodiment of FIGURE 5) formed of "Inermet" (a tungsten-containing carbide) and held together by means of the rivets 28 or equivalent structure. Rotor 20 further embodies the aforementioned intermediate ring 29 fixedly held between the rings 26 and 27 and formed of Armco iron (an iron containing very few impurities, consisting practically of pure iron). This intermediate or directional indicating ring 29 with the black line markings 24 centers the rotor rings 26, 27 relative to one another as best seen by the variant of FIGURE 5. Finally, the rotor 20 also incorporates the semi-spherical cup members 35, 36. Ring 29 possesses the previously considered bores 31 inclined at a uniform angle to the corresponding radius, as such is for instance set forth in my U.S. Patent 2,688,805, granted September 14, 1954, and entitled "Gyroscopic Apparatus."

As best seen by referring to FIGURE 5, at the equatorial plane of the rotor 20 the directional indicating ring 29 is provided with a groove 29a filled with luminescent material, for example tritium, and as generally indicated by reference character 30. This material 30 acts upon the one or the other transducers, e.g. photocells 33, 34 (FIGURE 4)—or appropriate photoresistors—for instance during autopiloting. These photocells or photoresistors 33, 34 are arranged next to one another, yet with a spacing which essentially is the same size as the width of the filling of luminescent material 30. In FIGURE 4 they are arranged in a horizontal plane passing through the center of the rotor 20 and embedded in a mass 136 (FIGURE 1) of synthetic resin (for instance an epoxy resin available on the market under the trademark "Araldit") within a recess 43 formed at the ring or sleeve 11. With this arrangement the apparatus functions as a directional gyro. Specifically, if the aircraft goes off its heading or course, then depending on which direction it does so, the luminescent material 30 will come into alignment with one or the other of the photocells or photoresistors 33 or 34 and a suitable signal will be fed to the schematically depicted control C to effect corrective operation of the automatic pilot. The control C does not form part of the invention and therefore need not be further considered. In a physical construction where such a pair or a further pair of transducers is arranged in FIGURE 4 at the dotted line positions 133, 134, and specifically a photocell or photoresistor in front of the plane of the drawing and one behind it the apparatus responds to lateral tilt or banking (warping) of the aircraft. On the other hand, if both photoelements at the region 133, 134 of FIGURE 4 are arranged so that one is to the left, the other to the right of the vertical plane passing through the rotor spin axis, then the apparatus obviously functions as artificial horizon. Thus, by using two pairs of these transducers the important advantage is attained that the same gyroscope can be used to perform as direction indicator and artificial horizon, or directional indicator and banking indicator.

In order to be able to combine the possibilities just considered, the photoelements 33, 34 according to the variant of FIGURE 5 can be set in a body 32 which is mounted to be rotatably adjustable through 90° in a stepped central bore 44 of the lower bearing cup 15. Depending upon adjustment, the apparatus then functions to respond to banking (warping) or in the depicted position responds to inclination of the longitudinal axis (artificial horizon).

The semi-spherical cups 35, 36 of the rotor 20 preferably consist of light metal. Each is equipped with a plug of brass arranged at the spin axis of the rotor which renders it possible to correct precession. Adjustment in the desired direction or heading through large angles is undertaken as with conventional gyroscopes, however, only then when the aircraft is moving and flying according to the data of another compass. (The zone of greatest spin velocity is indicated by a marking or indicia; it is necessary to bring the spinning rotor into the plane of this marking which first can be undertaken when the desired flight direction or heading has already been assumed.) To correct for deviations, i.e. small angles, the body of the aircraft moves through an angular magnitude which corresponds to the new given heading, this angular magnitude which is expressed in degrees can be read with respect to the directional indicating ring 29 which is oxydized black, as at 24. This ring, i.e. the entire rotor 20 does not follow the change in heading of the aircraft. In order to bring it without trouble into the new orientation position, a permanent magnet 37 is placed into the recess 38, in other words, immediate the directional indicating ring 29 of Armco iron, and perpendicular to such ring from one or the other side, depending upon which direction correction should be undertaken.

As soon as this directional indicating ring 29 overlies the line or marker of the new heading position, the permanent magnet 37 is removed. The time required for the positional change of the rotor 20 is relatively small.

It should be obvious that the aforementioned photocells or photoresistors and the tritium can be replaced by a capacitive or inductive system.

The pressure at which the fluid is introduced amounts to about between 0.4 to 0.6 kg./cm.$^2$, resulting in an operating pressure of about 0.2 to 0.3 kg./cm.$^2$; the spin velocity of the rotor amounting to slightly more than 35,000 r.p.m.

The described gyroscope can readily withstand the greatest accelerations. Centrifugal forces are without effect, they only cause a slight displacement of the rotor which thus has imparted at one spherical half a somewhat larger pressure than at the other half. This pressure difference causes two precessions, one positive the other negative, cancelling one another.

During trials in which the bearings of the rotor have been turned in an attempt to neutralize turbulence at prior art constructions, the desired results have not been obtained. Even if rotation is very slowly carried out it brings about an impermissible precession over longer time intervals. The new and inventive compass permits acrobatic or stunt flying; it functions in any random position.

Finally, in the variant shown in FIGURE 6 a capacitive system with capacitive rod-like probes or feelers 133, 134 is housed or accommodated in the member 132 (analogous to member 32 in FIGURE 5) formed of "Araldit." The member 132 can be rotated about its own axis through 90° depending upon, as previously explained, whether the apparatus is to be employed as artificial horizon or as banking indicator. The capacitive probes 133, 134 are arranged one next to the other. Each has an outer sleeve 135 of brass in which there is insulatively mounted the corresponding thin brass rod. The outer diameter of each sleeve 135 amounts to about 2 millimeters.

The outer sleeve 135 is supplied, as generally indicated at 137, with an alternating-current of a certain (high) frequency. This current passes to the inner rod 133 or 134 as soon as the ring 29 (of Armco iron) of the rotor is located in the region of the relevant probe. The current from the rod 133, 134 is amplified in an external amplifier in order to control the automatic pilot. The slight movements of the bearing bring about that the ring 29 is located one time in front of the probe 133, another time in front of the probe 134. The rotor rings 27, 28 formed of "Inermet" are antimagnetic.

It follows that for a directional gyro a pair of such probes 133, 134 would have to be arranged at the ring 11 in like manner as the photoelements 33, 34, previously considered.

What is claimed is:

1. Universal gyroscope comprising two oppositely situated substantially semi-spherical bearing cups for housing a rotor, a substantially spherical rotor mounted within said bearing cups, means for applying a pressurized fluid medium for driving and floatingly supporting said rotor, a support ring at which said bearing cups are mounted for rotation, said support ring having discharge bore means for the fluid medium disposed substantially in an equatorial plane, teeth means provided for said support ring, adjusting means engaging with said teeth means, a directional indicating ring arranged substantially at the region of the equator of said rotor, and pick-off means cooperating with said directional indicating ring for signaling the direction and amount of the inclination of said indicating ring about selectable axes relative to its datum position, whereby [such that] depending upon the position of said last-mentioned means the gyroscope is capable of performing as directional indicator, artificial horizon or banking indicator.

2. Universal gyroscope as defined in claim 1, wherein said directional indicating ring is formed at least partially of iron, means capable of being applied from externally of said gyroscope and cooperating with said directional indicating ring for bringing about heading changes of said rotor.

3. Universal gyroscope as defined in claim 1, wherein said externally applied means is a permanent magnet.

4. Universal gyroscope as defined in claim 1, wherein said two bearing cups are rotatably adjustable in position relative to said support ring, means for fixing said two bearing cups relative to said support ring after adjustment has been undertaken, such adjustment being performed such that the bearing cups assume a position in which there appears the greatest rotational speed of said rotor.

5. Universal gyroscope as defined in claim 1, wherein said directional indicating ring is formed of a soft iron with less than 1 percent impurities and provided with a groove substantially at the equatorial plane of said rotor, said groove being filled with a luminescent material, said pick-off means cooperating with said directional indicating ring being transducers with which said luminescent material coacts.

6. Universal gyroscope as defined in claim 1, wherein said pick-off means cooperating with said directional indicating ring comprises a pair of probe members adapted for controlling an automatic pilot when said directional indicating ring is situated directly opposite a given one of said probe members.

7. Universal gyroscope as defined in claim 6, wherein each probe member consists of two concentrically arranged elements insulated from one another and extending in close proximity to said rotor, means for delivering a high frequency alternating current to one of said elements, said elements cooperating with one another such that at least a portion of the delivered high frequency alternating current is transmitted to the other element as soon as said directional indicating ring is located opposite the relevant probe member.

8. Universal gyroscope as defined in claim 1, wherein said pick-off means cooperating with said directional indicating ring comprises a pair of components spaced at a small distance from one another and arranged in a substantially horizontal plane passing through said rotor.

9. Universal gyroscope as defined in claim 8, wherein said two components are mounted at said support ring.

10. Universal gyroscope as defined in claim 9, wherein said two components each constitute a transducer.

11. Universal gyroscope as defined in claim 1, wherein said pick-off means cooperating with said directional indicating ring comprises a pair of components spaced at a small distance from one another and arranged at the lower bearing cup.

12. Universal gyroscope as defined in claim 11, further including a rotatably mounted member inserted at said lower bearing cup, said two components being mounted at said rotatably mounted member.

References Cited

UNITED STATES PATENTS

| | | | |
|---|---|---|---|
| 2,688,805 | 9/1954 | Annen | 33—20 |
| 2,809,527 | 10/1957 | Annen | 33—204 |

WILLIAM D. MARTIN, JR., *Primary Examiner.*